(12) United States Patent
Näkkilä et al.

(10) Patent No.: US 12,219,907 B2
(45) Date of Patent: Feb. 11, 2025

(54) APPARATUS FOR CULTIVATION OF LONG-STEM VEGETABLE PLANTS, RELATED METHOD AND USES

(71) Applicant: LUONNONVARAKESKUS, Helsinki (FI)

(72) Inventors: Juha Näkkilä, Kaarina (FI); Liisa Särkkä, Littoinen (FI); Saila Karhu, Turku (FI); Kari Juhani Jokinen, Helsinki (FI); Risto Tahvonen, Piikkiö (FI)

(73) Assignee: LUONNONVARAKESKUS, Helsinki (FI)

( * ) Notice: Subject to any disclaimer, the term of this patent is extended or adjusted under 35 U.S.C. 154(b) by 75 days.

(21) Appl. No.: 18/014,101

(22) PCT Filed: Jul. 2, 2021

(86) PCT No.: PCT/FI2021/050514
§ 371 (c)(1),
(2) Date: Dec. 30, 2022

(87) PCT Pub. No.: WO2022/003258
PCT Pub. Date: Jan. 6, 2022

(65) Prior Publication Data
US 2023/0255152 A1    Aug. 17, 2023

(30) Foreign Application Priority Data
Jul. 3, 2020   (FI) .................................. 20205715

(51) Int. Cl.
*A01G 31/04*   (2006.01)
*A01G 22/05*   (2018.01)
*A01G 22/40*   (2018.01)

(52) U.S. Cl.
CPC ........... *A01G 31/042* (2013.01); *A01G 22/05* (2018.02); *A01G 22/40* (2018.02)

(58) Field of Classification Search
CPC ...... A01G 31/042; A01G 31/04; A01G 22/40; A01G 17/02; A01G 3/00; A01G 31/02;
(Continued)

(56) References Cited

U.S. PATENT DOCUMENTS 3,284,948 A * 11/1966 Kyle ..................... A01G 31/042
                                                                47/65
3,300,896 A *  1/1967 Lunstroth ............. A01G 31/042
                                                                47/59 R
(Continued)

FOREIGN PATENT DOCUMENTS

CN       108401719        8/2018
DE       3817289 A1  * 11/1989
(Continued)

OTHER PUBLICATIONS

Extended European Search Report, issued in European Patent Application No. 21833652.7 dated Jun. 27, 2024.
(Continued)

*Primary Examiner* — Kristen C Hayes
(74) *Attorney, Agent, or Firm* — NIXON & VANDERHYE

(57) ABSTRACT

An apparatus for cultivation of long-stem vegetable plants, related system, methods and uses are provided. The apparatus includes a frame rack with at least one essentially horizontal cultivation platform configured to support a stem portion of at least one long-stem vegetable plant rooted in a static cultivation tray, wherein each the cultivation platform is established by a conveying device and wherein speed of the conveying device is adjustable such, as to correspond to the speed of plant growth.

20 Claims, 4 Drawing Sheets

(58) Field of Classification Search
CPC .... A10G 22/05; A01D 45/006; A01D 45/008; A01D 46/30
See application file for complete search history.

(56) References Cited

U.S. PATENT DOCUMENTS

| | | | | |
|---|---|---|---|---|
| 3,425,158 | A * | 2/1969 | Kyle | A01G 31/042 226/170 |
| 11,412,674 | B1 * | 8/2022 | Montezano, III | A01G 31/02 |
| 2003/0121205 | A1 | 7/2003 | Van Weel | |
| 2010/0192458 | A1 | 8/2010 | Van Zijl | |
| 2016/0044873 | A1 * | 2/2016 | Jin | A01G 7/04 47/1.3 |
| 2016/0219811 | A1 * | 8/2016 | Kati | A01G 33/00 |
| 2017/0202163 | A1 * | 7/2017 | Aschheim | A01G 31/02 |
| 2018/0295792 | A1 | 10/2018 | Atwood et al. | |
| 2022/0408670 | A1 * | 12/2022 | Brigantino | A01G 31/042 |

FOREIGN PATENT DOCUMENTS

| | | |
|---|---|---|
| JP | 2007-151434 | 6/2007 |
| JP | 2008-148635 | 7/2008 |
| KR | 20120073480 A | 7/2012 |
| WO | 2016/023947 | 2/2016 |
| WO | 2019/104431 | 6/2019 |

OTHER PUBLICATIONS

International Search Report for PCT/FI2021/050514, dated Sep. 28, 2021, 4 pages.

Written Opinion of the ISA for PCT/FI2021/050514, dated Sep. 28, 2021, 6 pages.

* cited by examiner

APPARATUS FOR CULTIVATION OF LONG-STEM VEGETABLE PLANTS, RELATED METHOD AND USES

This application is the U.S. national phase of International Application No. PCT/FI2021/050514 filed Jul. 2, 2021 which designated the U.S. and claims priority to FI 20205715 filed Jul. 3, 2020, the entire contents of each of which are hereby incorporated by reference.

FIELD OF THE INVENTION

The present invention generally relates to a trellis-type apparatus for growing long-stem vegetable plants horizontally. In particular, the invention relates to the cultivation apparatus, which comprises one or more horizontal conveyor track loops optionally located at different levels, related system, methods and uses. The apparatus is suitable for indoor cultivation of long-vine vegetable plants, such as cucumber and tomato.

BACKGROUND

Access to sufficient amounts of safe and nutritious food is a key to sustaining life and promoting good health. Global demand for food will increase in the following years, while competition for natural resources for producing food will increase as well.

Globalization of food trade, a steadily growing world population and climate change can have an adverse impact on the long-term availability of world food resources. This will lead to such consequences as depletion of land and water reserves, stagnation of the potential yields of major crops and rise in energy prices, as well as underutilization of production possibilities in the developing world.

Human population is projected to rise up to about 9.6 billion by 2050. Together with widespread urbanization, reduction in productive farmland areas and extreme variations in weather conditions worldwide, this will set particular pressure on the agricultural sector. At the time being, about 50% of the world population lives in cities; however, by 2030 this figure is estimated to approach 70%.

Still, traditional open-field cultivation of plants requires large areas. The quality and quantity of the crops are affected by variations in climate and weather. The impact of weather is getting even more severe in the future due to the climate change. Depending on a calculation method, the agriculture industry globally produces up to 20-30% of greenhouse gas emissions.

One way to overcome the adverse effect of changing weather conditions is protected cultivation, such as greenhouse cultivation. However, also traditional greenhouse cultivation has the disadvantage of crops needing large areas to grow. Therefore, in urban areas, where land prices are higher than in rural areas, cultivation in the open field or in traditional greenhouses can only be performed in a limited (small) scale.

In many countries it has become more difficult to transport the fresh grown food to city centers because of urbanization and increasing traffic problems. In addition, increased environmental awareness among customers has created a desire to local cultivation. Thus, there is an increased need and interest in growing near- or in urban environments. Plant factories enable the cultivation of plants in locations where traditional, open field cultivation is not possible, for example in urban areas. In plant factories the cultivation environment is highly controlled and designed to meet the needs of the cultivated plant(s). Use of pesticides and the harmful effects of unfavorable weather conditions can be reduced or eliminated. In theory, cultivation is possible 24 hours a day all year long without fluctuations in crop quality.

To increase the amount of crop grown per unit area of land, different types of cropping systems have been developed where farming is done either vertically or horizontally, preferably at multiple vertical levels. Typically, in plant factories one cultivates low-growing leaf vegetables such as lettuce and herbs, but there are some applications suitable for long-stem plants, such as vine plants.

Devices and systems for advanced vertical cultivation of vine vegetables are known from the state of art. CN108401719 (Guang, M. et. al) discloses an automatic trellis system for vertical cultivation of cucumber. Cucumber seedlings are supported on separate vertical guide wires arranged in a loop-shaped trellis. The guide wire is extended by a winding mechanism as the seedlings grow upwards. US2003121205 (Van Weel) discloses a device for growing an individual long-stem plant, such as cucumber, tomato and the like, on a guide wire shaped in the form of a frame. US2010192458 (Van Zijl) discloses an apparatus for accommodating a fast-growing stem of long-stem greenhouse plants, such as cucumber, tomato, pepper or eggplant, in which the plant is arranged to grow vertically on a circumferential medium, which rotates relative to a fixed support base.

The above mentioned systems for vertical growing of long-stem plants are hindered with several drawbacks. A major disadvantage in existing vertical cultivation systems is a lack of provisions for regulating a length of a stem of the plant growing high upwards. Further, in conditions of vertical cultivation, where vine plants grow side-by-side, available (typically artificial) lighting does not provide sufficiently uniform illumination throughout the entire length of the plant, which diminishes the plant's growing potential and decreases crops' yield. Vertical cultivation solutions generally require rather spacious facilities; therefore, space optimization in such facility is challenging and often impossible.

Conventional vertical high-wire training (high-wire cultivation) systems may produce about 180 kg of cucumbers and/or 70 kg of tomatoes per annum.

Cultivation systems, where plants are grown using essentially horizontal platforms or levels, are also known from the state of art. For example, WO2019104431 (Vesty) discloses an automatic recirculating plant cultivation system comprising a conveyor belt arrangement that conveys a plurality of plants growing in trays. WO2016023947 (Aschheim et. al) discloses an arrangement for horizontal hydroponic cultivation of lettuce plants, comprising a mesh-like conveyor belt having openings for placing a growing medium therein. Conveying speed of said conveyor belt is adjusted such, that during a time period the short-growing plant spends on the belt, it grows to maturity (typically 3-10 weeks). However, all these systems are designed for cultivation of short, leafy vegetables, such as lettuce and herbs.

The state of the art is thus limited in a sense that no reasonable solution for horizontal cultivation of high-growing utility plants, such as vine vegetable plants and/or long-stem herbs, in conditions of limited space and/or artificial lighting, has been available so far.

In this regard, an update in the field of techniques aiming at cultivating long-stem vegetable plants, such as vine crops, is still desired, in view of addressing challenges associated with maintaining and/or improving production yield in conditions of limited space.

SUMMARY OF THE INVENTION

An objective of the present invention is to solve or at least alleviate each of the problems arising from the limitations and disadvantages of the related art. The objective is achieved by various embodiments of an apparatus for horizontal cultivation of long-stem vegetable plants, such as vine vegetable plants, a related cultivation system, method and uses. Thereby, in one aspect of the invention an apparatus for cultivation of long-stem vegetable plants is provided, according to what is defined in the independent claim 1.

In embodiment, the apparatus comprises a frame rack and at least one essentially horizontal cultivation platform configured to support a stem portion of at least one long-stem vegetable plant rooted in a static cultivation tray. In the apparatus, said cultivation platform is established by a conveying device, wherein speed of said conveying device is adjustable such, as to correspond to the speed of plant growth.

In embodiment, the conveying device is arranged to convey, along an essentially horizontal plane, the stem portion of said at least one vegetable plant in a direction d1 opposite to a direction d2 of plant growth, the stem portion of said plant being supported on the conveying device.

In embodiment, the speed of said conveying device is adjustable such, as to establish, within the cultivation platform, a harvesting region, from where vegetable crops are collected.

In embodiment, the apparatus further comprises a stem-collecting mechanism. Said stem-collecting mechanism is provided as a roller, a wheel, a coil, or any other device suitable for receiving and collecting the stem of the long-stem vegetable plant.

In embodiment, the conveying device is a conveyor device, configured as any one of: a belt conveyor, a chain conveyor and a string conveyor (a wire conveyor) optionally equipped with suitable fasteners, such as clamps, clips and the like, to support stem portions of long-step plant(s).

In embodiment, speed of said conveying device and optionally an operation of the stem-collecting mechanism is/are at least partly automated.

In embodiment, the conveying device comprises a number of parallel tracks arranged sideways at a predetermined distance from one another, each said track being arranged to support the stem portion of an individual long-stem vegetable plant.

In embodiment, the apparatus comprises a number of cultivation platforms arranged one above another in the frame rack to form a so called stack configuration.

In embodiment, the apparatus further comprising an artificial illumination arrangement, such as LED lighting, for example.

In aspect, a cultivation system is provided according to what is defined in the independent claim 10.

In another aspect, a method for cultivation of long-stem vegetable plants is provided, according to what is defined in the independent claim 11. The method is advantageously implemented in the apparatus according to described embodiments. In the method, a stem portion of at least one long-stem vegetable plant rooted in a static cultivation tray is supported on a cultivation platform of the apparatus, said cultivation platform being established by a conveying device, wherein speed of said conveying device is adjustable such, as to correspond to the speed of plant growth.

In further aspect, use of the apparatus and/or of the system, according to the embodiments, is provided for cultivation of long-stem, high-growing vegetable plants, according to what is defined in the independent claim 14.

In embodiment, said long-stem, high-growing vegetable plant is selected from any one of a vine vegetable plant, along-stem herbaceous plant and any other vine-like plant.

In embodiment, the long-stem, high-growing vegetable plant is a plant belonging to a group of species, said group consisting of: *Cucumis* spp., *Solanum* spp., *Citrullus* spp., *Capsicum* spp., *Cucurbita* spp., *Phaseolus* spp., *Humulus* spp., *Vitis* spp., and *Actinidia* spp. Thus, the vine vegetable plant can be selected from the group consisting of: cucumber, tomato, aubergine, sweet pepper (also referred to as bell pepper), melon, squash plant, zucchini, bean, hop, and any other vine-like utility plant (e.g. grapevines, kiwifruit, etc.).

The utility of the present invention arises from a variety of reasons depending on each particular embodiment thereof. Primarily, the invention generally aims at providing a cost-effective solution to producing long-stem (long-vine) vegetable plants, such as fruiting vegetable plants including, but limited to cucumber, sweet pepper, tomato, and other utility plants, according to the present disclosure.

The invention is particularly beneficial for exploitation with plant factory based cultivation methods suitable for urban environment. The production facility presented hereby can be located in a closed farming environment, which makes the production independent of a climate zone. The factory may be situated in a challenging environment, in where traditional cultivation of green vegetable plants is impossible (e.g. deserts, the Arctic zone, etc.).

Present invention provides a solution, in which a number of apparatuses (frame racks) and/or a number of essentially horizontal conveyor tracks (provided within the same frame rack) can be stacked, which enables multilayer cultivation and increases, in turn, the yield per cubic meter. Significant and often unexpected losses due to weather fluctuations can be avoided, as well as the costs implied by transportation of (fresh) crops from elsewhere. Overall, the invention adds to sustainability and cost-effectiveness of vine vegetables' commercial cultivation methods, in particular, the methods employed in modern greenhouses and plant factories.

In the invention, the horizontally growing long-stem plant is illuminated along the whole length of the plant and/or from every angle, which significantly enhances the growth and improves the yield of the crop plant. The invention is further beneficial in a sense that it can operate fully automatically, which means no manpower is required for operating the moving of the plant, cutting the vines or removing leaves and harvesting the fruit. The invention thus allows for reducing an amount of physical work for a farmer. Layering the cultivation platforms (cultivation levels) improves energy efficiency of a production facility.

Due to the automation and the smart multilayer configuration, the apparatus and method for horizontal cultivation of vegetable crops according to the present disclosure allow for reducing labor-associated costs and for improving occupational safety. The latter is improved because the present solution eliminates the need for manual harvesting and/or treating vegetable crops at a height of several meters (which is not uncommon in traditional vertical, high-wire cultivation), and which is naturally slow and labor-intensive.

According to preliminary studies, the inventive concept allows for increasing production yield of vine vegetables by about 20-30% per plant, as compared to traditional high-wire cultivation.

The apparatus and the system presented hereby further allows for efficient water recycling and controlling an amount of nutrients and/or related waste.

In present disclosure, the expression "long-stem vegetable plant" is utilized to indicate so called vine vegetable plants and, in particular, long-vine vegetable plants capable of producing edible crops. The expressions "long-stem vegetable plant", "vine vegetable plant", and "long-vine vegetable plant" are used interchangeably and refer, in a non-limiting manner, to vegetable crop plants and herbaceous plants/green crop plants with high-growing stems.

The expression "a number of" refers hereby to any positive integer starting from one (1), e.g. to one, two, or three. The expression "a plurality of" refers hereby to any positive integer starting from two (2), e.g. to two, three, or four.

The terms "first" and "second" are not intended to denote any order, quantity, or importance, but rather are used to merely distinguish one element from another, unless explicitly stated otherwise.

Different embodiments of the present invention will become apparent by consideration of the detailed description.

DETAILED DESCRIPTION OF THE EMBODIMENTS

Figure 1:
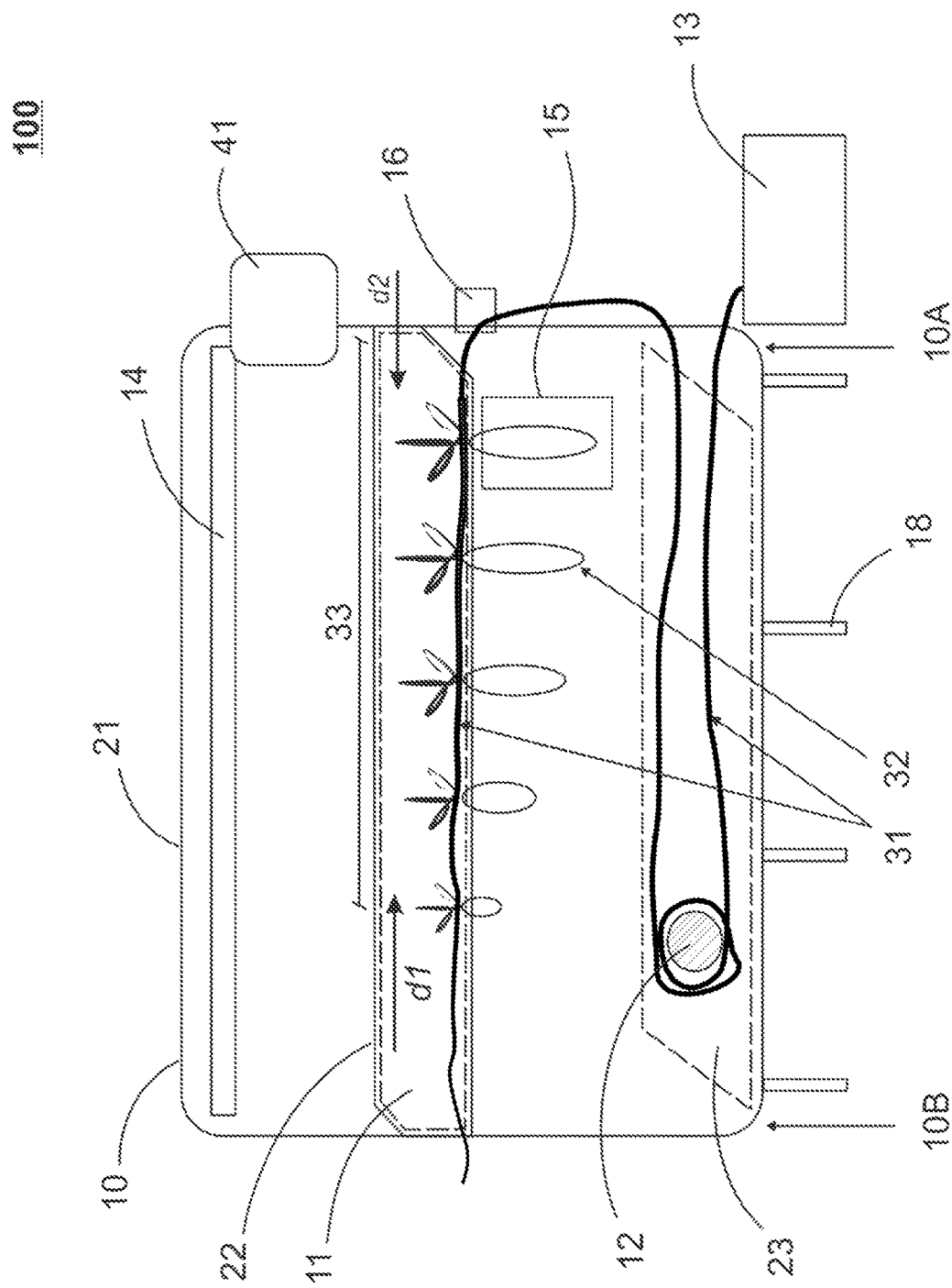
FIG. 1 schematically illustrates an apparatus 100 for cultivation of long-stem vegetable plants, according to an embodiment.

Detailed embodiments of the present invention are disclosed herein with the reference to accompanying drawings. The same reference characters are used throughout the drawings to refer to same members. Following citations are used for the members:
- 100—an apparatus for cultivation of long-stem vegetable plants;
- 10—a frame rack;
- 10A, 10B a first end and a second end of the frame rack 10, accordingly;
- 11—a conveying device;
- 11A, 11B—conveyor tracks;
- 12—a stem-collecting mechanism;
- 13—a (cultivation) tray;
- 14—an illumination device;
- 15—a harvester device;
- 16—a leaf-clipping device;
- 17—separator(s);
- 18—support legs;
- 21, 23—a top and a base of the frame rack 10;
- 22—a cultivation platform;
- 31—a long-stem vegetable plant (a stem portion of the plant);
- 32—crops (fruits) of the long-stem vegetable plant;
- 33—a harvesting region;
- 41—a control unit.

FIG. 1 illustrates, at 100 a concept, underlying various embodiments of an apparatus for cultivation of long-stem vegetable plants. The apparatus 100 is particularly suitable for cultivation of (long)-vine vegetable crops, such as fruiting vegetable crops, including, but not limited to cucumber, tomato, pepper, such as sweet pepper also known as bell pepper, aubergine, zucchini, squash, etc.; for cultivation of long-stem herbaceous plants, such as bean and hops, and for cultivation of any other vine-like plant with high-growing stem (e.g. grapevines and kiwifruit). The apparatus can be utilized for indoor and outdoor cultivation of said crops, in greenhouses and/or plant factories, as well as at the open-air.

The apparatus 100 comprises a frame rack 10 embodied as a rack-type framework made of metal or any other suitable material. The frame rack 10 (and the apparatus 100, accordingly) has a first end 10A and a second end 10B. The frame rack further has a top 21 and a base 23. The top level may be open. In some configurations, the base 23 is provided as a grate or a mesh. The frame rack may have a number of support legs 18 optionally equipped with wheels or similar arrangements to facilitate relocation of the rack.

The apparatus 100 further comprises at least one cultivation platform 22 disposed essentially between the top 21 (top level) and the base 23 (base level) of the frame rack. The cultivation platform 22 is positioned essentially horizontally, i.e. along an essentially longitudinal plane, the latter being defined as a plane along and across a distance 10A-10B defining the length of the rack 10. Alternatively, the cultivation platform may be inclined at a predetermined angle in directions towards any one of the end sides 10A or 10B.

Figure 2:
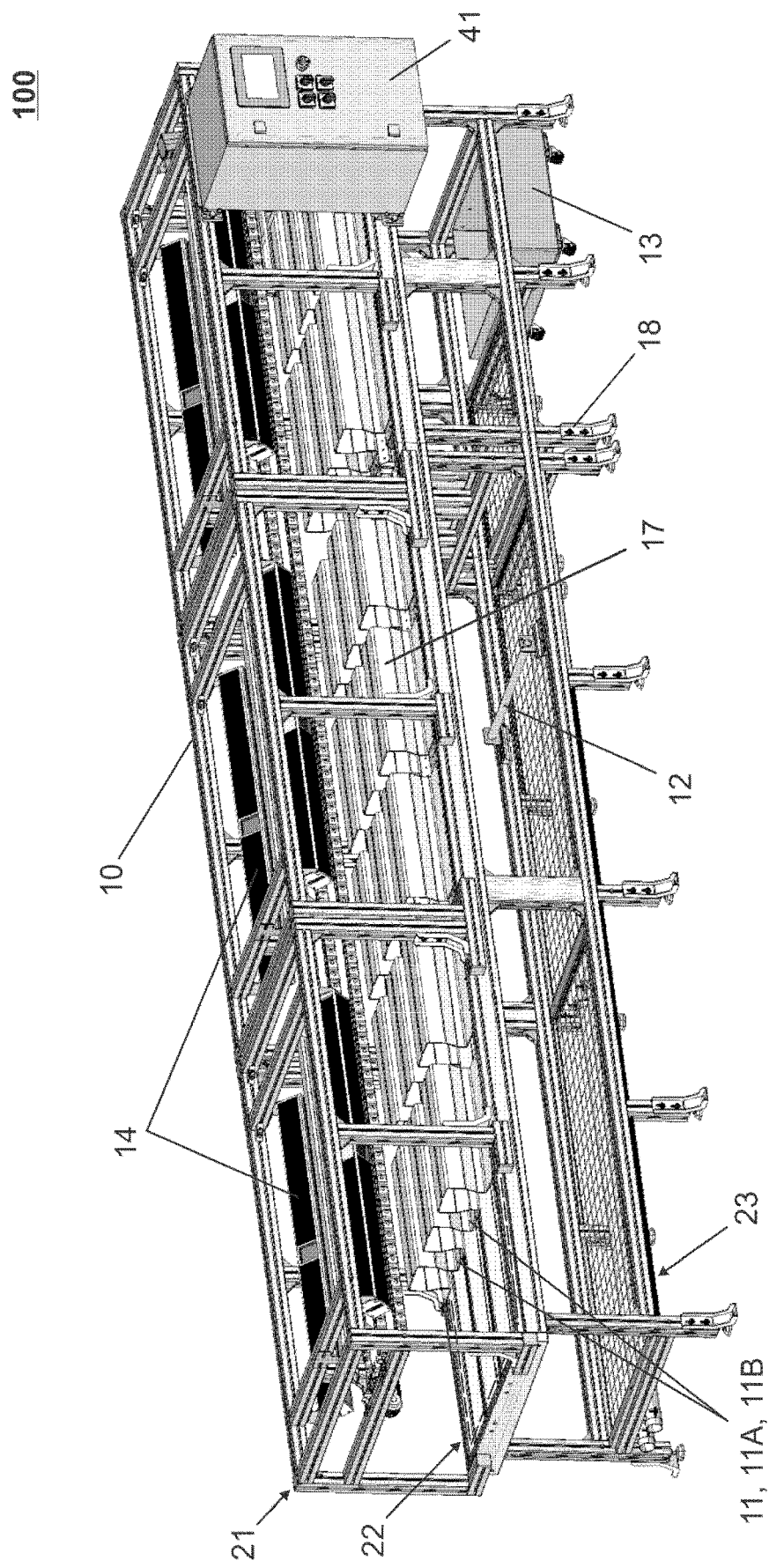
FIGS. 2 and 3 show a perspective view and an end side view, accordingly, of the apparatus 100, according to the embodiment.

The cultivation platform 22 comprises or consists of a conveying device 11 mounted in the frame rack 10. The conveying device 11 may be implemented as a belt-type conveyor with one or several tracks 11A, 11B (FIG. 2). The conveying device 11 can be configured as a conventional belt-, chain-, string- or wire-type conveyor, or as any other appropriate type of the conveyor. The conveying device can be configured as a number of strings or wires extending along the length of the frame rack 10 (i.e. between the ends 10A and 10B), wherein a stem portion of the cultivated plant is supported on such string or wire. Each said string or wire may form a cultivation track 11A, 11B within the platform 22.

Hence, in the frame rack 10, the at least one cultivation platform 22 is established by said conveying device 11. Alternatively, the conveying device 11 can be supported on a separate support deck, frame or rail.

In some configurations, the apparatus 100 comprises more than one cultivation platform 22 mounted in the frame rack 10 one above another to form a parallel "stack" structure (not shown). Such configuration enables layered cultivation of vine vegetable plants, wherein each layer is established by the cultivation platform (the conveying device). In such multilayer configuration, each cultivation platform 22 is established by a separate conveying device 11.

Figure 3:
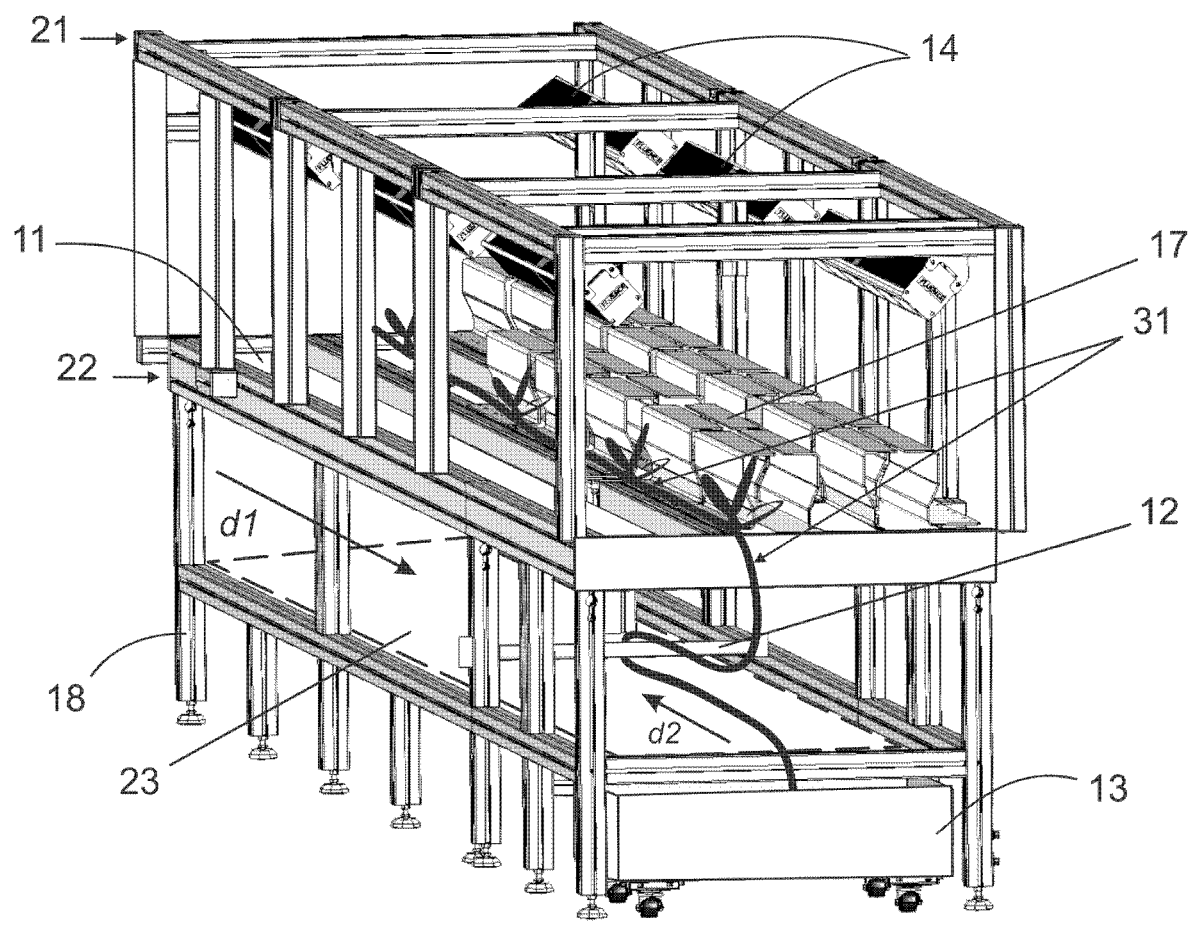

An exemplary cultivation platform 22 (FIGS. 2, 3), defined substantially by the distance 10A-10B, has a length of about 4 meters and a width of about 0.8 meters. A distance between the cultivation platform 22 and the top 21 of the frame rack (viz. height) is about 1 meter.

In some configurations (not shown), provision of the base level 23 in the frame rack 10 is omitted. In such an event, the base level is formed by the cultivation level 22/the conveying device 11 optionally supported on a support deck or a frame.

The conveying device 11 is configured to support a stem portion of at least one long-stem vegetable plant 31. For the purposes of the invention it is essential that it is a stem portion of said long-stem vegetable plant that is supported and conveyed on the conveying device 11. The conveying device 11 thus performs a conveying action relative to a stem portion of at least one long-stem plant supported on it. Therefore, the reference number 31 is used hereafter to refer to said stem portion of the plant. The at least one vegetable plant is rooted in at least one tray 13 (a cultivation tray) placed proximal to the apparatus 100. It is preferred that the tray(s) 13 is/are placed at one end side (10A, referred to as a "rooting end"; FIG. 1) of the apparatus. The tray(s) 13 is/are static through the entire cultivation cycle. The tray(s) can be provided as a container or a number of containers comprising a suitable substrate material (seeding bed material or rooting bed material).

Selection of substrate-/bed materials naturally depends on plants cultivated on the apparatus 100. Exemplary substrate materials include, but are not limited to essentially solid substrates, such as soil, peat, moss (e.g. Sphagnum moss), and/or rockwool supplemented with suitable fertilizers) and essentially liquid substrates provided as a liquid or a suspension, for example. The tray(s) 13 can be filled with the abovesaid substrate materials. Alternatively, mist cultivation (aeroponics) can be adapted, wherein water with nutrients is distributed, by spraying, for example, within the tray 13. Thus generated mist is captured by roots of the plant(s) positioned in the tray.

The apparatus 100 may thus exploit traditional planting methods in essentially solid substrates, as well as hydroponics based methods (growing plants in nutrient solutions), and aeroponics based methods (growing plants in misted air environment).

The cultivation tray 13 is planted with at least one long-stem (high-growing) vegetable plant. The tray 13 may be equipped with an appliance for collecting drainage water for re-use (not shown). Utilizing a number of containers or a larger container with compartments allows for cultivating distinct species or genera in the same apparatus 100.

The exemplary apparatus 100 having dimensions specified above is designed for supporting three- or four plants placed sideways on the conveying device 11. It is assumed that taking the present disclosure as a whole, a skilled person would have no difficulty in modifying the apparatus 100 for simultaneous cultivation of any appropriate number of long-stem vegetable plants.

In the apparatus, the movement- and the conveying speed of said conveying device 11 is adjustable such, as to essentially correspond to the speed of plant growth.

Movement and conveying speed of said conveying device 11 can be adjusted by means of a suitable gear, such as a motorized bevel gear, for example. A bevel gear is particularly useful for belt conveyors, since its beveled gear system increases the torque power of the gear, which makes the conveyor operate smoothly and efficiently.

In operation, the conveying device 11 is adjusted to convey the stem portion 31 of at least one vegetable plant in a first direction d1 (FIGS. 1, 3), said first direction being essentially opposite to a direction of plant growth (the latter is defined hereby as a second direction d2). The direction d2 of the plant growth is defined hereby for the plant having its stem portion positioned and supported on the essentially horizontal cultivation platform 22. For the purposes of the invention it is essential, that during operation of the conveying device (i.e. during conveying), the stem portion 31 of said at least one plant is supported on the cultivation platform 22 (hereby, on the conveying device 11).

The plant may be optionally supported on the cultivation platform by a number of suitable fasteners and/or support-/fixation appliances, e.g. brackets, clamps or clips (not shown). The stem portion of the plant can be attached to the cultivation platform/to the conveying device manually, i.e. by the operator, in order to guide an apex portion of the plant in right direction. Operation of these fasteners and/or fixation appliances may be at least partly automated. Nevertheless, the plant may be placed and supported on the platform without any fixation appliances.

The invention recognizes a concept of formation of a so called harvesting region within the cultivation platform 22. Once the vegetable plant is sufficiently mature to produce vegetable crops 32 (FIG. 1), these crops are collected within a predetermined area on the cultivation platform 22 referred to as a harvesting region 33.

By the term "vegetable crops" we refer to any desired crop (fruitage product) yielded by and harvested from the long-stem vegetable plants cultivated on the apparatus 100, wherein said crops are defined botanically as any one of: vegetables, fruits, flowers, berries, pods (e.g. bean pods), foliage (e.g. green leafy foliage), tubers, and the like.

However, if the cultivation platform 22 would be preserved still (as in conventional solutions), the long-stem plant would overgrow the cultivation area and would have its apex portion "escaping" the frame rack (via the end 10B opposite to the end 10A, at which the seeding bed is positioned). Vegetable crops produced proximal to these newly formed apical parts of the plant would be difficult to collect. To solve this problem, in the apparatus 100, conveying speed of the conveying device 11 is adjustable such, as to establish, within the cultivation platform 22, a harvesting region 33, from where mature vegetable crops 32 are collected. To preserve a position of said harvesting region 33 on the cultivation platform 22 substantially constant, speed of the conveying device 11 is adjusted to correspond to the speed of the plant growth. At the same time, the conveying device 11 is adjusted to convey the stem portion 31 of the plant in a direction (d1) opposite to the direction (d2) of said plant growth. By such an arrangement, a permanent harvesting region 33 is established on a moving cultivation platform 22. Movement of the platform 22 is realized in continuous manner or during predetermined periods (with alternating periods of movement and halt).

Speed of the conveying device 11 may be further adjusted such that a time period the stem portion 31 of the plant spends on the cultivation platform 22 corresponds to a maturation period of the said plant.

Operation of the cultivation platform 22/the conveying device 11 can be semi-automated or fully automated. At least conveying speed of said conveying device and/or duration and periodicity of halt periods can be automated.

By regulating conveying speed of the conveying device 11, an area defining the harvesting region 33 can be adjusted. To improve production rates, it may be desirable to produce crops along (and across) the entire cultivation platform, i.e. at a distance 10A-10B.

Vegetable crops 32 may be gathered manually or by means of an automated harvester device 15/a harvester robot provided with the apparatus 100 (FIG. 1).

In operation, seedlings are planted in the cultivation tray 13 placed at one end (the rooting end 10A) of the apparatus 100. The tray 13 may be placed at such a height, that the substrate surface is disposed at essentially the same level as the cultivation platform 22/the conveying device 11 (not shown). Alternatively, the cultivation tray 13 may be placed at the base level 23 (FIGS. 1-3), whereby a growing seedling is guided upwards until it reaches the cultivation platform 22/the conveying device 11 (not on the figures). Once the seedling is placed on the platform 22 it adopts a growth direction d2 along the essentially horizontal plane defined by the cultivation platform 22 (and the conveying device 11). Then, the growing seedling is guided along the horizontal conveying device 11. Until the seedling has reached the end (10B) of the cultivation platform opposite to the rooting end (10A) and/or the plant has begun producing crops, movement of the conveying device 11 needs not be activated.

The conveying device 11 is preferably configured such, as to facilitate collecting of vegetable crops 32 manually or by means of the automated harvester device 15. As shown on FIG. 1, mature vegetable crops 32 are hanging from the cultivation platform 22. The conveying device 11 may thus comprise a number of parallel tracks 11A, 11B (FIG. 2) arranged sideways at a predetermined distance from one another, each said track being arranged to support the stem portion 31 of an individual long-stem vegetable plant. Additionally or alternatively, the conveying device may be provided with a number of apertures through which mature vegetable crops 32 may be collected.

Plants (stem portions thereof) supported on the conveying device 11 may be further separated from one another by means of separators 17. The separators 17 can also be used to separate plants placed onto several conveyor tracks from each other. The separators 17 are preferably removable appliances made from plastics (e.g. polycarbonate) or any other material, relatively lightweight and easy to clean.

To collect those portions of the stem that do not produce crops any longer, the apparatus 100 further comprises a stem-collecting mechanism 12. The stem collecting mechanism is configured to collect and to hold the stem portions of the plant whose harvesting period has ended such, as to prevent these portions from dangling- and/or falling down from the frame rack 10 and the platform 22. The stem-collecting mechanism can be a beam, a roller, a wheel or a coil, for example. Any other appropriate solution may be adopted. The apparatus 100 shown on FIGS. 1-3 comprising the stem-collecting mechanism 12 implemented as a roller. Stem portions are pulled, from their lower/rooting ends (10A), around the roller to be wound around said roller in a winding coil-like manner. In configurations shown on FIGS. 1-3, the stem-collecting mechanism 12 is located essentially below the cultivation platform 22. Provision of the stem-collecting mechanism at the rooting end 10A (e.g. near the seeding bed 13) is not excluded.

In the apparatus 100, operation of the stem-collecting mechanism 12 can be at least partly automated. In such an event, operation of said stem-collecting mechanism 12, in terms of rotating speed, for example, or any other operation parameter that determines the stem-collecting action, as defined hereinabove, is coordinated with the operation of the conveying device 11, in particular, with conveying speed of said conveying device.

To facilitate receiving stem portions onto the stem-collecting mechanism 12, the apparatus 100 can be further equipped with a leaf-clipping device 16 (FIG. 1). Operation of the leaf-clipping device 16 is preferably automated.

The apparatus 100 further comprises an illumination arrangement 14. The illumination arrangement 14 is provided as an artificial illumination arrangement comprising a number of light sources, e.g. LED arrays, arranged above the cultivation platform 22. Additionally or alternatively, a number of suitable light sources may be arranged sideways with regard to said cultivation platform 22. In an event the apparatus 100 comprises several cultivation platforms 22 in a stacked configuration (not shown), each level established by the cultivation platform 22 may be illuminated with a number of light sources to ensure uniform illumination through the stem portions of all vegetable plants cultivation in the apparatus 100.

Irradiance intensity and/or quality of the light sources provided within the illumination arrangement 14 can be adjusted such, as to attain optimal crop production yields throughout the cultivation platform(s). Adjustment of light sources may be made collectively or individually. Illumination arrangement 14 is advantageously configured to replace day-light by emitting electromagnetic radiation in visible spectrum (within a range of about 380 nm to about 740 nm). Additionally or alternatively, some irradiance-related parameters, such as quality and day-length, for example, can be regulated to attain a number of additional functionalities, e.g. to inhibit sprouting and sprawling. For the latter purpose, light sources configured to emit e.g. far-red radiation (within a range of about 700 to 800 nm) or blue radiation (within a range of about 400 nm to 500 nm) can be utilized.

The apparatus 100 can thus be configured to comprise a number of cultivation platforms 22 arranged one above another in the same frame rack 10. Provision of such multilayer, stacked solution allows for noticeable improvement of cultivation efficiency and yield. A number of the apparatuses 100 with one or more cultivation platforms 22 can be further arranged into modular cultivation systems according to one another aspect of the invention.

Figure 4:
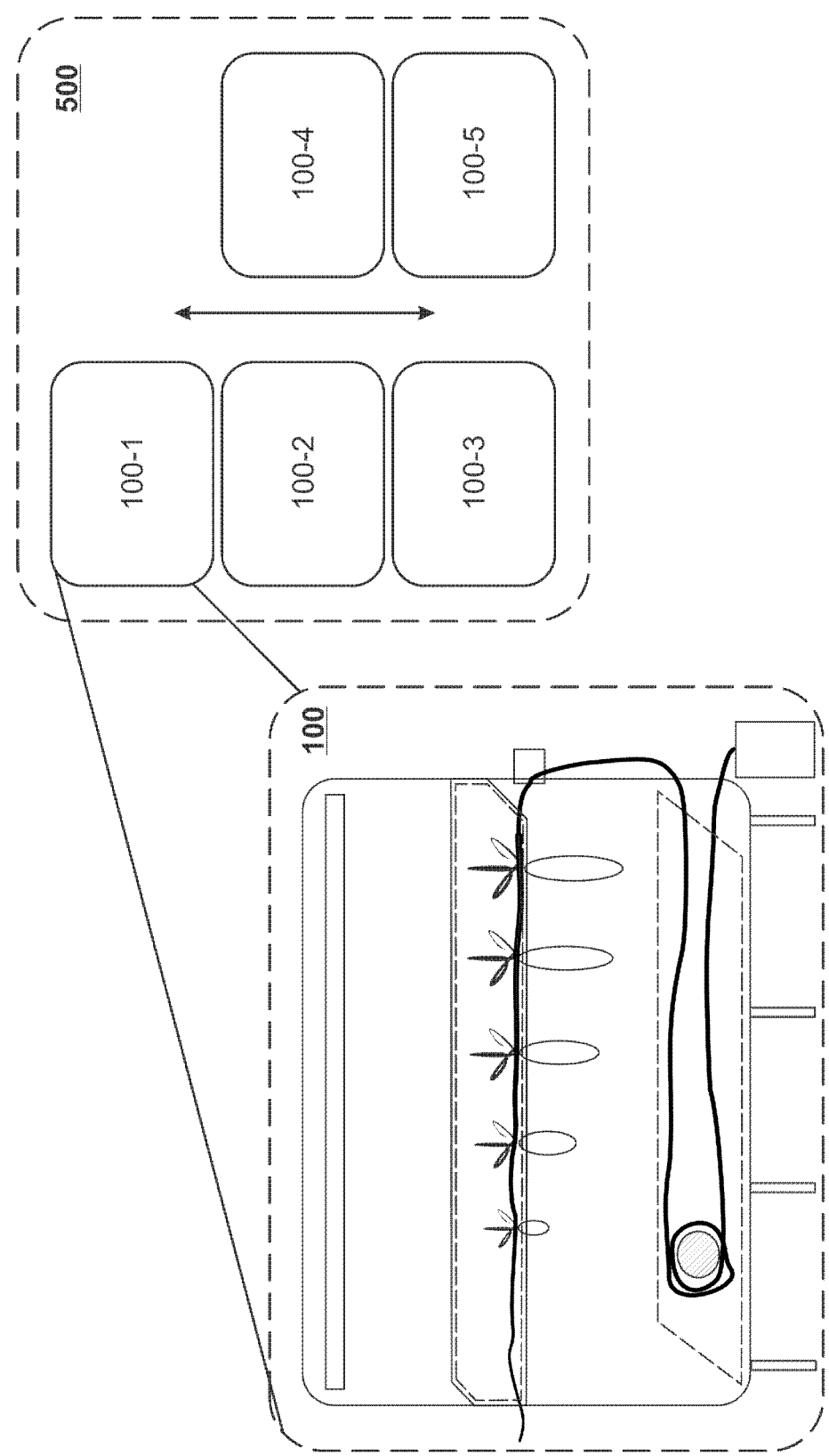
FIG. 4 schematically illustrates a cultivation system 500, comprising a number of apparatuses 100.

FIG. 4 schematically illustrates a cultivation system 500, according to some aspect of the invention. The system 500 comprises a number of apparatuses 100 according to any one of the embodiments described hereinabove (dashed box). In the system 500, the apparatuses 100 form individual units or modules, which modules are designated on FIG. 4 by reference numerals 100-1, 100-2, 100-3, 100-4 and 100-5. In the system, said apparatuses are arranged in stacks (see modules 100-3, 100-2 and 100-1 arranged on the top of one another and forming an exemplary stack 1 and modules 100-5 and 100-4 forming an exemplary stack 2) and/or in arrays (e.g. sideways with regard to one another). A passage formed between the arrays is shown on FIG. 4 by a double-head arrow. It is clear that the modular system 500 can be established with any appropriate number of apparatuses 100 (modules 100). When the modules are provided in stack configurations, it may be advantageous to have protective trays between the modules (not shown) to collect water tricking from the upper modules to the lower modules. Water from these protective trays may be collected into the drainage appliance provided with the cultivation tray(s) 13 as discussed hereinabove.

Control over the at least partly automated operation of each apparatus 100 in the system 500 is implemented through a control unit 41 configured to receive outputs from a variety of detectors, sensors and/or measurement devices provided in at least the conveying device 11, the illumination arrangement 14, the harvester robot 15, and/or the leaf-clipping device 16 (not shown) and to produce signals to actuate and de-actuate a plurality of switches and related appliances provided in the aforementioned devices 11, 14, 15 and/or 16. The control unit 41 is preferably equipped with an emergency switch. The control unit 41 preferably comprises at least one processing unit configured a standalone processor and/or as a remotely controlled solution, and a user interface. For a modular configuration, a wired or wireless communication can be enabled between the control units 41 of the modules 100 and a central processing unit (CPU) module (not shown). The CPU module thus monitors the status of all apparatus modules 100 in the system 500 and provides the link for network communications to enable coordinated transmittal and processing of input- and output data.

Centralized control over the apparatus 100 and over the system 500 (via the CPU module, for example) can be implemented in at least partly automated manner or in a fully automated manner.

In another aspect, a method for cultivation of long-stem vegetable plants in the apparatus 100 is provided, said apparatus comprises a frame rack 10 and at least one essentially horizontal cultivation platform 22. The cultivation platform or platforms is/are each established by a conveying device 11. In the method, a stem portion 31 of at least one long-stem vegetable plant rooted in a static cultivation tray 13 is supported on the conveying device and conveying speed of said conveying device is adjustable such, as to correspond to the speed of plant growth. The cultivation method advantageously exploits the apparatus 100 optionally provided as a part of the system 500 and implemented according to any one of the embodiments described hereinabove.

In embodiment, the method comprises conveying, along the essentially horizontal plane, the stem portion of said at least one vegetable plant supported on the conveying device 11 in a direction d1 opposite to the direction d2 of plant growth.

In embodiment, the method comprises adjusting conveying speed of said conveying device such, as to establish, within the cultivation platform 22, a harvesting region 33, from where vegetable crops 32 are harvested.

In embodiment, adjustment of conveying speed of the conveying device 11 and optionally an operation of the stem-collecting mechanism 12 is at least partly automated.

The method can be advantageously exploited for indoor and outdoor cultivation of long-vine vegetable plants, e.g. at open-air, in greenhouses and/or plant factories.

In further aspect, use of the apparatus 100 and/or the system 500, according to any one of the embodiments described hereinabove, is provided for cultivation of long-stem, high-growing vegetable plants provided as any one of vine vegetable plants and long-stem herbaceous plants. The long-stem, high-growing vegetable plant can be provided as a plant belonging to a group of species, said group consisting of: *Cucumis* spp., *Solanum* spp., *Citrullus* spp., *Capsicum* spp., *Cucurbita* spp., *Phaseolus* spp., *Humulus* spp., *Vitis* spp., and *Actinidia* spp.

Cultivated plants include, but are not limited to: cucumber (genus *Cucumis; C. sativus*), tomato (genus *Solanum; S. lycopersicum*), aubergine (genus *Solanum; S. melongena*), melon (plants belonging to family Cucurbitaceae, including, but not limited to watermelon (genus *Citrullus; C. lanatus*) and honeydew melon (genus *Cucumis; C. melo*)); sweet pepper (or bell pepper; *Capsicum* spp.; *C. annuum*), and squash plant (*Cucurbita* spp., including zucchini, squashes and pumpkins) Long-stem herbaceous plants include, but are not limited to bean (genus *Phaseolus; P. vulgaris*) and hop (genus *Humulus; H. lupulus*). Additionally or alternatively, the apparatus 100 and/or the system 500 can be utilized for growing any other vine-like plant with high-growing stem, such as grapevines (*Vitis* spp.) and kiwifruit (*Actinidia* spp.), for example.

Whether a cultivated plant needs pollination, a number of biological- and/or artificial pollination options can be conceived.

Overall, the apparatus 100 and the system 500 enable growing of species and cultivars of long-stem fruiting vegetables that produce vegetable crops/fruits of any size. However, cultivation of long-stem cultivars producing small-sized fruits, such as so called "pickle" cucumber fruits, for example, may have certain benefits, since the fruits of said dwarf plant species may better fit between the cultivation platforms 22 and/or between the modules 100.

The following section presents, in a non-limiting manner, the results attained in a number experimental trials.

Example 1. Description of the Installation

An apparatus 100 is designed for side-by-side cultivation of three or four cucumber plants separated from each other by a thin wall 17 (FIG. 2). A cultivation platform 22 is established by a conveying device 11. Cultivation platform is about 4 m long and about 0.8 m wide. The distance between the cultivation platform 22 and a top part 21 of the apparatus is about 1 m.

The plants were rooted in a static cultivation tray 13 provided at one end (10A) of the frame rack. The stem 31 of each cucumber vine was guided to grow horizontally on the cultivation platform, while the cucumber crops/fruits hang downwards. The apparatus was operated as described hereinabove. During the operation, the lowest leaves were automatically cut off by the leaf-clipping device 16. A leafless stem 31 was then collected by a stem-collecting mechanism 12 disposed at a base level 23.

Cucumber vines supported on the cultivation platform 22 were illuminated by LED lights 14 arranged to provide uniform illumination for the plant during its all growing stages. In addition, irradiance in the far-red region provided by LED fixtures was used to inhibit sprouting. In the present example, lights were controlled using Itumic Multi Station 100 climate controller while the irrigation was handled using Itumic Mix Station 300 fertilizer mixer. To mediate movement of the conveying device 11, a motorized bevel gear operated with a 400 V power supply system was utilized.

Experimental trials thus employed the modular system 500 comprising one module 100 (Example 2). The module 100 comprised the cultivation platform 22. In horizontal cultivation conducted in the module 100, a harvest period began earlier as compared to a conventional vertical high-wire installation (with plants in vertical growth position); therefore, an average number of harvest weeks has increased (see col. IV, Table 1).

Comparison tests were conducted with cucumber vines vertically grown in a conventional, standstill high-wire cultivation installation. Yield comparison was performed based on a number of fruits collected during harvesting (Example 2).

Example 2. In the experiments, cucumber (cultivar Jawell) was cultivated in different settings. In Control setup (0), cucumber plants were growing in the conventional vertical high-wire cultivation installation. Plants were grown in rows set about 130 cm apart (wherein a plant row was about 60 cm wide and a corridor between the plant rows was about 70 cm wide). The seedlings in the row were spaced 25 cm apart.

In Experiment 1 the cucumber was cultivated in the system 500 comprising one cultivation module (viz., the apparatus 100) comprising a cultivation platform established by a 0.8 m wide conveying device configured to receive three (3) plants placed side-by-side (referred to as three (3) tracks).

The results are summarized in Table 1.

TABLE 1

Results based on the amount of harvested crops.

|  | I<br>Average number of cucumbers/ per plant/ per week | II<br>Plant density (plant/m$^2$) | III<br>Average Yield/week (number of cucumbers/ m$^2$/week) | IV<br>Harvest period (weeks) | V<br>Average yield/total (number of cucumbers/m$^2$) |
|---|---|---|---|---|---|
| Control (0) Traditional | 8.5 | 2.7 | 22.95 | 10 | 229 |
| Experiment 1 1 module, 3 tracks | 10.6 | 0.6 | 6.4 | 10.5 | 67 |

Experimental trials conducted with cucumber vines clearly indicate that using the apparatus and method, according to the present disclosure, the number of fruits can be increased by about 25% per plant (Example 2, Table 1). Thus, when cultivated in the apparatus 100, each cucumber plant produces a number of fruits increased by about 25% compared to a plant cultivated in a conventional vertical high-wire method (compare results presented in column I of Table 1 (average number of cucumbers obtainable per plant per week) between the Experiment 1 (10.6) and the control (8.5)). This increase in productivity can be explained by improved photosynthesis ability due to more uniform distribution of light along the stem of the (long)-vine plant. In addition, horizontal cultivation makes water and/or nutrient solutions more accessible to plant(s), since these liquids do not have to rise upwards against the gravity (as in conventional/traditional systems).

While in conventional vertical high-wire system the plant density (number of plants per 1 m$^2$) was 2.7, the plant density in the apparatus 100 was 0.6; i.e. 4 times lower than in the conventional solution (Example 2, Table 1).

The cucumber plant grows approximately one meter per week achieving a length of several meters in a few weeks. Arranging the apparatuses 100 into a stacked configuration allows for efficient multilayer farming even in small-sized cultivation facility, such as a building-integrated greenhouse or plant factory.

Depending on a number of cultivation racks (modules/apparatuses 100) placed on top of and/or next to each other, the fruit yield (amount of fruits produced) per a unit area of a cultivation surface can be significantly increased. The latter markedly improves profitability of a production facility, in particular, in urban areas, where the lack of space (and associated high costs for land) severely limit economically viable implementation of traditional greenhouse production. The solution presented hereby thus provides a feasible alternative to conventional vertical high-wire cultivation solutions, markedly improved in terms of labor cost-efficiency and occupational safety related factors.

It shall be appreciated by those skilled in the art that the embodiments set forth in the present disclosure may be adapted and combined as desired. The disclosure is thus intended to encompass any possible modifications of the apparatus and methods described hereby, recognizable by those of ordinary skill in the art, within a scope of appended claims.

The invention claimed is:

1. An apparatus for cultivation of long-stem vegetable plants used in combination with a static tray and at least one long-stem vegetable plant rooted in a static tray, the apparatus comprising a frame rack and at least one essentially horizontal cultivation platform configured to support a stem portion of the at least one long-stem vegetable plant rooted in the static tray, the static tray placed proximal to the apparatus, wherein said at least one cultivation platform comprises a conveying device, wherein a speed of said conveying device is adjustable such, as to correspond to the speed of plant growth, and wherein the conveying device is arranged to convey the stem portion of said at least one vegetable plant in a direction opposite to the direction of plant growth, with the stem portion of the at least one vegetable plant being supported on the conveying device.

2. The apparatus of claim 1, further comprising a harvesting region within the cultivation platform, wherein the speed of the conveying device is adjustable such, as to establish, within the cultivation platform, the harvesting region, from where vegetable crops are harvested.

3. The apparatus of claim 2, further comprising a stem-collecting mechanism.

4. The apparatus of claim 2, wherein the conveying device is a conveyor, configured as any one of: a belt conveyor, a chain conveyor and a string conveyor.

5. The apparatus of claim 1, further comprising a stem-collecting mechanism.

6. The apparatus of claim 5, wherein the stem-collecting mechanism is a roller, a wheel or a coil.

7. The apparatus of claim 5, wherein the conveying device is a conveyor, configured as any one of: a belt conveyor, a chain conveyor and a string conveyor.

8. The apparatus of claim 1, wherein the conveying device is a conveyor, configured as any one of: a belt conveyor, a chain conveyor and a string conveyor.

9. The apparatus of claim 1, further comprising a control unit and gear, wherein adjustment of speed of said conveying device is at least partly automated by the control unit and the gear.

10. The apparatus of claim 9, further comprising a control unit, wherein adjustment of an operation of the stem-collecting mechanism is at least partly automated by the control unit.

11. The apparatus of claim 1, wherein the conveying device comprises a number of parallel tracks arranged sideways at a predetermined distance from one another, each said track being arranged to support the stem portion of an individual long-stem vegetable plant.

12. The apparatus of claim 1, comprising a number of cultivation platforms arranged one above another in the frame rack.

13. The apparatus of claim 1, further comprising an illumination arrangement.

14. A cultivation system, comprising a number of apparatuses as defined in claim 1, arranged in stacks and/or in arrays.

15. A method for cultivation of long-stem vegetable plants in an apparatus comprising a frame rack and at least one essentially horizontal cultivation platform comprising a conveying device, wherein the at least one long-stem vegetable plant is rooted in a static tray placed proximal to the apparatus, in which method a stem portion of the at least one long-stem vegetable plant rooted in the static tray is supported on the conveying device, wherein a speed of said conveying device is adjustable such, as to correspond to the speed of plant growth, and wherein the method further comprises conveying the stem portion of said at least one vegetable plant supported on the conveying device in a direction opposite to the direction of plant growth.

16. The method of claim 15, comprising adjusting the speed of the conveying device such, as to establish, within the cultivation platform, a harvesting region, from where vegetable crops are harvested.

17. The method of claim 15, wherein speed adjustment of the conveying device is at least partly automated.

18. The method of claim 17, wherein adjustment of an operation of the stem-collecting mechanism is at least partly automated.

19. A method for cultivation of long-stem, high-growing vegetable plants provided as any one of vine vegetable plants and long-stem herbaceous plants, the method comprising providing the system of claim 14, and conveying the stem portion of said at least one vegetable plant supported on the conveying device in a direction opposite to the direction of plant growth.

20. The method of claim 19, wherein the long-stem, high-growing vegetable plant is a plant belonging to a group of species, said group consisting of: *Cucumis* spp., *Solanum Citrullus* spp., *Capsicum* spp., *Cucurbita* spp., *Phaseolus* spp., *Humulus* spp., *Vitis* spp., and *Actinidia* spp.

* * * * *